United States Patent [19]

Hyoi

[11] Patent Number: 5,160,947
[45] Date of Patent: Nov. 3, 1992

[54] EYEGLASS FRAME WITH FLANGED BRIDGE OF NT ALLOY

[75] Inventor: Isao Hyoi, Fukui, Japan

[73] Assignee: Murai Co., Ltd., Fukui, Japan

[21] Appl. No.: 536,569

[22] PCT Filed: Nov. 18, 1988

[86] PCT No.: PCT/JP88/01173

§ 371 Date: Jul. 17, 1990

§ 102(e) Date: Jul. 17, 1990

[87] PCT Pub. No.: WO90/05937

PCT Pub. Date: May 31, 1990

[51] Int. Cl.$^5$ .......................... G02C 5/14; G02C 5/02
[52] U.S. Cl. ..................................... 351/124; 351/121; 351/41
[58] Field of Search ................... 351/41, 86, 124, 154, 351/121, 153, 111, 133

[56] References Cited

FOREIGN PATENT DOCUMENTS

| 382227 | 8/1939 | Fed. Rep. of Germany ...... 351/124 |
| 35-22377 | 9/1960 | Japan . |
| 89717 | 7/1981 | Japan ..................................... 351/41 |
| 63-214716 | 9/1988 | Japan . |

Primary Examiner—Rodney B. Bovernick
Attorney, Agent, or Firm—Armstrong, Nikaido, Marmelstein, Kubovcik & Murray

[57] ABSTRACT

The present invention relates to an eyeglass frame which uses parts made of an NT alloy. The eyeglass frame according to the present invention comprises a bridge (9) formed of a material which is difficult to work and a pair of right and left rims (2) which are formed integrally with opposite ends of said bridge (9). With this arrangement, easy production processes can be achieved and the number of parts can be reduced, whereby it is possible to mass-produce eyeglass frames.

1 Claim, 2 Drawing Sheets

EYEGLASS FRAME WITH FLANGED BRIDGE OF NT ALLOY

TECHNICAL FIELD

The present invention relates to an eyeglass frame employing a material which is extremely difficult to work, for example, an NT alloy (shape memory alloy).

BACKGROUND ART

A conventional eyeglass frame of this type is shown as an eyeglass frame 100 in FIG. 5. The eyeglass frame 100 comprises a pair of rims 101. Temples 103 are secured to the pair of rims 101 by means of hinges 102, respectively.

Each of the rims 101 supports a lens 104 by its inner periphery.

In addition, the rims 101 are connected to each other at their inner portions by means of a bridge 105. The bridge 105 has an inverted U shape, and its opposite ends are threadedly secured to the inner portions of the rims 102 by screws 106, respectively.

However, according to the above-described prior art, since the bridge 105 is secured by the screws 106 as described above, securing operations are needed and the number of manufacturing steps as well as the number of parts increases. In particular, if an NT alloy (shape memory alloy) is employed as the material of the bridge 105, serious problems will be encountered in that it is difficult to cut the NT alloy. For example, if screw-mounting holes are to be formed in the bridge 105 made of the NT alloy and screws are to be threadedly fitted into the holes, time-consuming working is required and mass production is extremely difficult.

DISCLOSURE OF THE INVENTION

It is therefore an object of the present invention to solve the above-described problem which have been experienced with the prior art, that is, the problem that an large number of working steps are required and mass production is therefore impossible. The present invention is characterized by comprising a bridge made of an NT alloy and a pair of right and left rims each having an inner portion formed integrally with one end of the bridge. With the above-described arrangement, it is not necessary to cut or drill the bridge and eyeglass frames of the same design can be advantageously mass-produced.

BEST MODE FOR CARRYING OUT THE INVENTION

An embodiment of the present invention will be described below with reference to the accompanying drawings.

Figure 1:
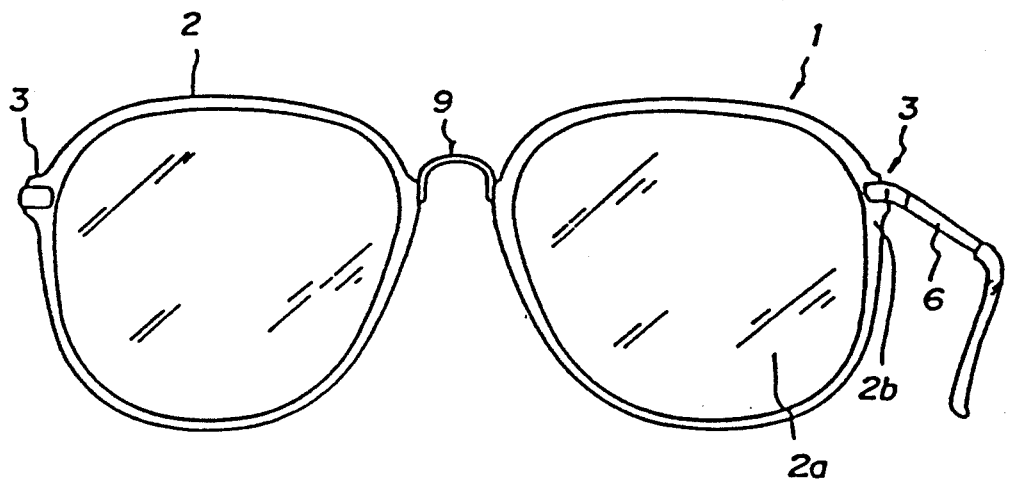
FIG. 1 is a front elevational view showing an eyeglass frame according to the present invention.
Figure 2:
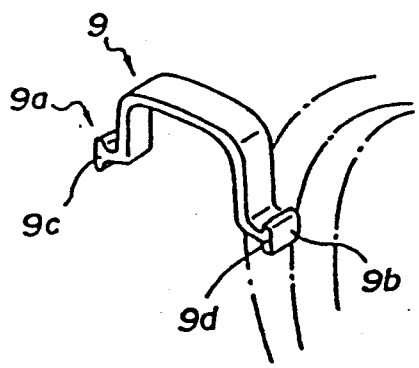
FIG. 2 is an partial enlarged view showing the manner in which a bridge is secured to the eyeglass frame according to the present invention.
Figure 3:
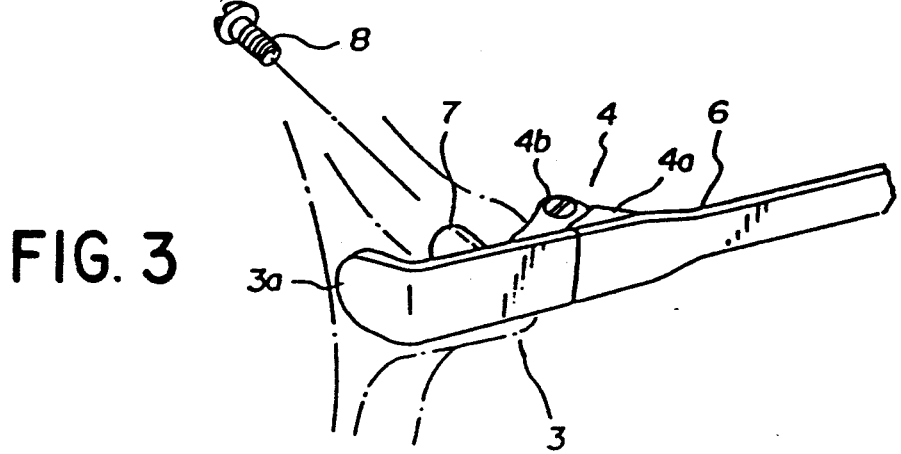
FIG. 3 is an enlarged view showing a method of securing a side joint to the eyeglass frame according to the present invention.

Referring to FIG. 1, an eyeglass frame 1 according to the present invention comprises plastics rims 2. Each of the rims 2 supports a substantially circular lens 2a at its inner side.

Opposite sides 2b of the rims 2 are provided with side joints 3, and a temple 6 is pivotally secured to a hinge 4 of each of the side joints 3. Each of the side joints 3 has a bend 3a which is formed by bending one end of a stripe-shaped member. The bend 3a is disposed on the front side of each rim 2 when the temple 6 is to be secured. The inner side of the side joint 3 is provided with a screw-mounting hole 7 of cylindrical configuration. The side joints 3 are secured to the opposite sides 2b of the respective rims 2 with screws 8 threadedly fitted into the corresponding screw-mounting holes 7.

The hinge 4 is secured to an extension of each of the side joints 2, and the hinge 4 comprises a frame 4a and a hinge screw 4b. The temple 6 made of a material which is extremely difficult to work, for example, an NT alloy, is secured pivotally on the hinge 4.

A bridge 9 for connecting a pair of right and left rims 2 will be explained below. The bridge 9 has an inverted U shape and two ends 9a and 9b. Each of the ends 9a and 9b is provided with flange portions 9c and 9d, and these flange portions 9c and 9d are formed integrally with each of the inner sides of the respective rims 2. Thus, the pair of right and left rims 2 is fixedly connected to each other.

Figure 4:
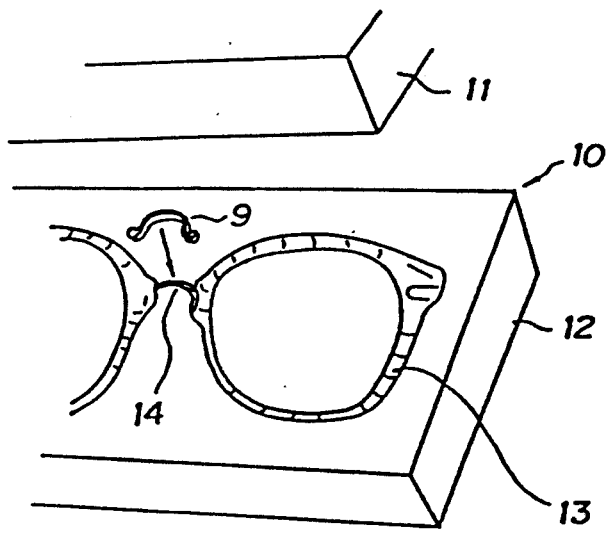
FIG. 4 is a perspective view showing a mold for use in producing eyeglass frames.
Figure 5:
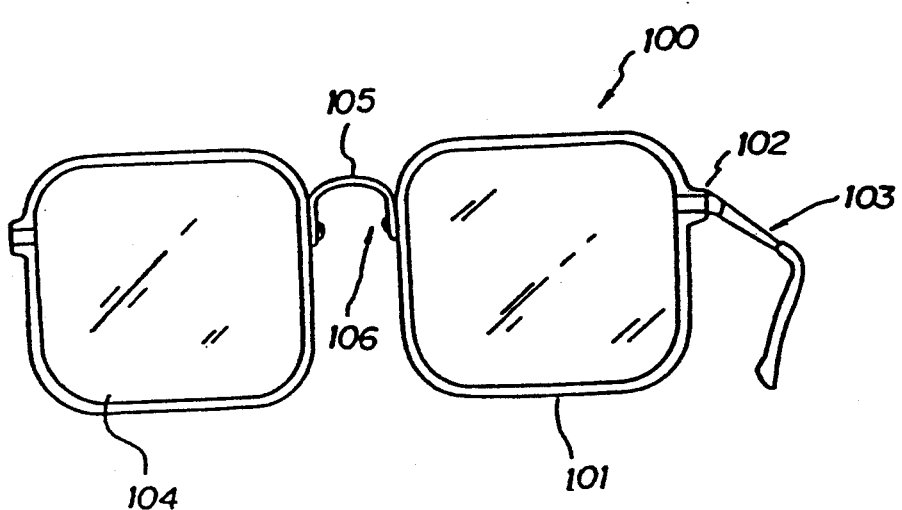
FIG. 5 is a front view showing an eyeglass frame according to the prior art.

A method of connecting the bridge 9 to the rims 2 will be explained below. FIG. 4 shows a mold assembly 10 for molding the rims 2, and the mold assembly 10 comprises an upper mold 11 and a lower mold 12. Depressions 13, which corresponds to the respective rims 2 of the eyeglass frame 1 which is finished as a product, are formed in the lower mold 12, while a depression (not shown) corresponding to the eyeglass frame 1 is formed in the upper mold 11. In addition, a depression 14 is formed between the depressions 13 corresponding to the right and left rims 2. This depression 14 serves to receive the bridge 9 during molding.

When the eyeglass frame 1 is to be formed by using the mold assembly 10, the bridge 9 is fitted into the aforesaid depression 14. After the upper mold 11 and the lower mold 12 have been combined, a molten plastic material is charged through an introduction port which is defined in communication with the depressions 13. When a predetermined time elapses and the plastic material is solidified, the upper mold 11 and the lower mold 12 are separated from each other and the finished rims 2 of the eyeglass frame 1 is taken out.

Since the eyeglass frame 1 according to the present invention has the above-described arrangement, it can be easily produced and, in addition, the number of parts can be reduced and mass production is therefore possible.

Although the foregoing explanation refers to the NT alloy as one example of material which is extremely difficult to work, another kind of alloy may of course be employed.

INDUSTRIAL APPLICABILITY

The eyeglass frame according to the present invention employs parts made of a material which is extremely difficult to work, for example, an NT alloy, but can be easily produced with a reduced number of parts. In addition, the eyeglass frame of the present invention finds suitable use in the field of eyeglass frames which can be mass-produced.

I claim:

1. An eyeglass frame, comprising:
   right and left frame portions for supporting right and left lenses therein;
   right and left temples pivotally attached to said right and left frame portions, respectively; and
   a bridge member connecting said right and left frame portions, said bridge member including two ends with each end provided with a flanged portion thereupon, said bridge member being formed of an NT alloy, said right and left frame portions are formed of a molded plastic material, and are molded to surround the flanged portions of the bridge, wherein the flanged portions are anchored in the right and left frame portions.

* * * * *